US011862923B2

United States Patent
Zhu et al.

(10) Patent No.: US 11,862,923 B2
(45) Date of Patent: Jan. 2, 2024

(54) HIGH CLADDING POWER MODE FIELD ADAPTER FOR KILOWATT FIBER LASERS

(71) Applicant: Lumentum Operations LLC, San Jose, CA (US)

(72) Inventors: Gongwen Zhu, San Jose, CA (US); Guan Sun, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/649,635

(22) Filed: Feb. 1, 2022

(65) Prior Publication Data

US 2023/0161099 A1 May 25, 2023

Related U.S. Application Data

(60) Provisional application No. 63/264,431, filed on Nov. 22, 2021.

(51) Int. Cl.
*G02B 6/14* (2006.01)
*G02B 6/255* (2006.01)
(Continued)

(52) U.S. Cl.
CPC ............ *H01S 3/06745* (2013.01); *G02B 6/14* (2013.01); *G02B 6/2552* (2013.01); *G02B 6/262* (2013.01);
(Continued)

(58) Field of Classification Search
CPC ........................ G02B 6/02004; G02B 6/02376; G02B 6/036; G02B 6/1228; G02B 6/14;
(Continued)

(56) References Cited

U.S. PATENT DOCUMENTS

| 7,184,623 B2 * | 2/2007 | Cai | G02B 6/2552 |
| | | | 359/333 |
| 7,991,255 B2 * | 8/2011 | Salokatve | G02B 6/2835 |
| | | | 65/408 |

(Continued)

FOREIGN PATENT DOCUMENTS

EP 0582894 A1 2/1994

OTHER PUBLICATIONS

Dr. Rüdiger Paschotta, "Mode Field Converters," The RP Photonics Encyclopedia (2 pages) [retreived from https://www.rp-photonics.com/mode_field_converters.html on Dec. 17, 2021].

(Continued)

*Primary Examiner* — Ryan A Lepisto
(74) *Attorney, Agent, or Firm* — Harrity & Harrity, LLP

(57) ABSTRACT

As described herein, a mode field adapter (MFA) comprises a first fiber including a core associated with a fundamental mode field diameter and a cladding with a diameter that decreases toward a waist. The MFA comprises a second fiber including a core associated with a fundamental mode field diameter that matches the fundamental mode field of the first fiber at the waist and a cladding with a diameter that matches the diameter of the cladding of the first fiber at the waist and increases from the waist of the second fiber. The cladding of the first fiber may be adiabatically etched such that a core-to-cladding ratio of the first fiber changes over a length of the first fiber, and the core and the cladding of the second fiber may be adiabatically tapered such that a core-to-cladding ratio of the second fiber is constant over a length of the second fiber.

13 Claims, 6 Drawing Sheets

(51) Int. Cl.
*G02B 6/26* (2006.01)
*G02B 6/42* (2006.01)
*H01S 3/067* (2006.01)
*G02B 6/02* (2006.01)
*H01S 3/094* (2006.01)
*G02B 6/036* (2006.01)
*G02B 6/122* (2006.01)

(52) U.S. Cl.
CPC ........ *G02B 6/4296* (2013.01); *H01S 3/06733* (2013.01); *H01S 3/06754* (2013.01); *G02B 6/02004* (2013.01); *G02B 6/02376* (2013.01); *G02B 6/036* (2013.01); *G02B 6/1228* (2013.01); *G02B 6/2558* (2013.01); *H01S 3/094007* (2013.01)

(58) Field of Classification Search
CPC .... G02B 6/2552; G02B 6/2558; G02B 6/262; G02B 6/4296; H01S 3/06733; H01S 3/06745; H01S 3/06754; H01S 3/094007
See application file for complete search history.

(56) References Cited

U.S. PATENT DOCUMENTS

| | | | | |
|---|---|---|---|---|
| 8,457,456 | B2* | 6/2013 | Kopp | G02B 6/264 385/11 |
| 9,529,149 | B2* | 12/2016 | Chen | C03B 37/15 |
| 9,696,493 | B2* | 7/2017 | Bansal | H01S 3/094053 |
| 9,766,407 | B2* | 9/2017 | Weiner | G02B 6/305 |
| 9,871,338 | B2* | 1/2018 | Price | H01S 3/094007 |
| 9,972,961 | B2* | 5/2018 | Sipes, Jr. | H01S 3/06758 |
| 11,280,965 | B2* | 3/2022 | Beaudoin | G02B 6/2821 |
| 11,515,682 | B2* | 11/2022 | Hwang | H01S 3/06729 |
| 2013/0236153 | A1* | 9/2013 | Rochette | C03B 37/15 83/13 |
| 2023/0008662 | A1* | 1/2023 | Faulhaber | G02B 6/245 |
| 2023/0168436 | A1* | 6/2023 | Logunov | G02B 6/3822 385/60 |

OTHER PUBLICATIONS

Gongwen Zhu, "High efficiency mode field adapters fabricated with CO2 laser splicer," Conference Proceedings of SPIE vol. 10899, Components and Packaging for Laser Systems V, 2019 (7 pages).

Zhou et al., "Mode-field adaptor between large-mode-area fiber and single-mode fiber based on fiber tapering and thermally expanded core technique," Applied Optics, vol. 53, No. 22, 2014 (5 pages).

Faucher et al., "Mode field adaptation for high power fiber lasers," CLEO Quantum Electron, Laser Science Conference and Photonic Applications Systems Technologies, Paper CFI7, 2007 (2 pages).

Lin et al., "Tapered optical fiber sensor based on localized surface plasmon resonance," Optics Express, vol. 20, No. 20, 2012 (10 pages).

Korposh et al., "Tapered Optical Fibre Sensors: Current Trends and Future Perspectives," Sensors (Basel), vol. 19, Issue 10, 2019 (39 pages).

* cited by examiner

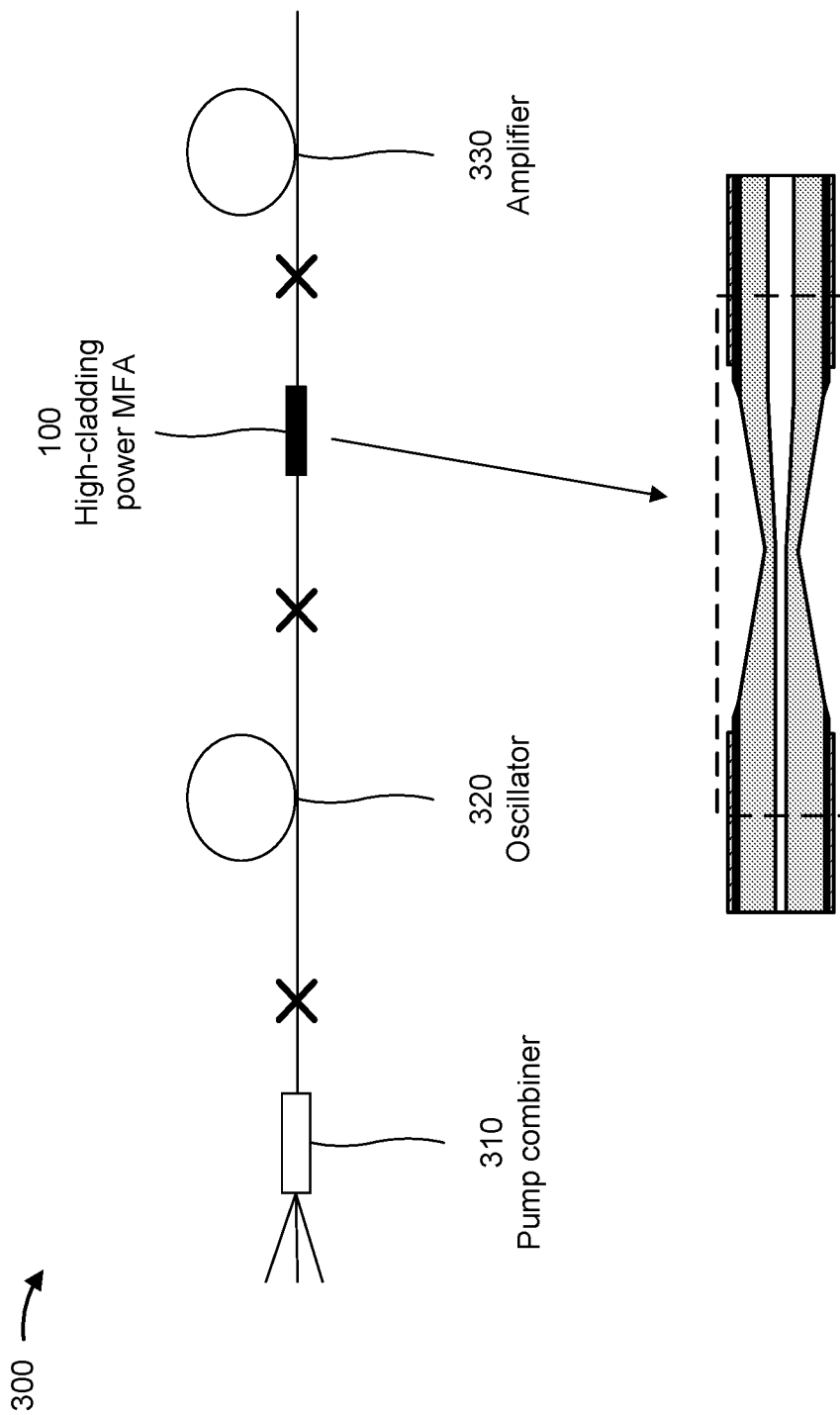

HIGH CLADDING POWER MODE FIELD ADAPTER FOR KILOWATT FIBER LASERS

CROSS-REFERENCE TO RELATED APPLICATION

This Patent application claims priority to U.S. Provisional Patent Application No. 63/264,431, filed on Nov. 22, 2021, and entitled "HIGH CLADDING POWER MODE FIELD ADAPTER FOR KILOWATT FIBER LASERS." The disclosure of the prior Application is considered part of and incorporated by reference into this Patent Application.

TECHNICAL FIELD

The present disclosure relates generally to a mode field adapter (MFA) and to an MFA that matches core fundamental mode fields and cladding sizes of an input fiber and an output fiber in order to handle high-power cladding light and preserve brightness.

BACKGROUND

A mode field adapter (MFA), sometimes referred to as a mode field converter, is an optical device that can be used to expand or contract a mode in transverse spatial dimensions in order to connect two fibers with different core diameters, different cladding diameters, and/or numerical apertures. For example, in an optical system where an input fiber and an output fiber have different core sizes (e.g., a high-power fiber laser or fiber amplifier), a standard splice between the two asymmetric fiber geometries may lead to high insertion loss and degraded beam quality. Accordingly, an MFA may be used as a bridge between a fundamental core mode of the input fiber and a larger output fiber. For example, an MFA may use an adiabatic taper between the two fibers to gradually expand or compress the mode field between the input fiber and the output fiber. For example, an MFA may be used to efficiently expand a mode field of a single-mode optical fiber or a large-mode-area (LMA) fiber to match a core fundamental mode (which may be referred to herein as an LP01 mode) of a larger LMA fiber and/or to expand the mode field of a polarization-maintaining (PM) fiber to match the LP01 mode of a polarization-maintaining LMA (PLMA) fiber. Furthermore, an MFA may be bidirectional, whereby an MFA can be used in reverse to compress a mode field when the output end is used as an input. Accordingly, when an MFA is spliced into a beam delivery system or another high-power setup, signal transmission and/or beam quality may be improved relative to a standard splice.

SUMMARY

In some implementations, a mode field adapter includes a first fiber including a core associated with a fundamental mode field diameter and a cladding, surrounding the core of the first fiber, with a diameter that decreases toward a waist of the first fiber, wherein the cladding surrounding the core of the first fiber is adiabatically etched such that a ratio between the core of the first fiber and the cladding surrounding the core changes over a length of the first fiber; and a second fiber including a core associated with a fundamental mode field diameter that matches the fundamental mode field diameter of the first fiber at a waist of the second fiber and a cladding, surrounding the core of the second fiber, with a diameter that matches the diameter of the cladding of the first fiber at the waist of the second fiber and increases from the waist of the second fiber, wherein the core and the cladding surrounding the core of the second fiber are adiabatically tapered such that a ratio between the core of the second fiber and the cladding surrounding the core of the second fiber is constant over a length of the second fiber.

In some implementations, an optical system includes a first optical device having a core to carry core light and a cladding, surrounding the core, to carry high-power cladding light; a second optical device having a core to carry core light and a cladding, surrounding the core, to carry high-power cladding light, wherein the core of the first optical device and the core of the second optical device have different fundamental mode fields; and a mode field adapter coupled between the first optical device and the second optical device, wherein the mode field adapter comprises: an input fiber having a core and a cladding, surrounding the core of the input fiber, with a diameter that decreases adiabatically, wherein the cladding surrounding the core of the first fiber is adiabatically etched such that a ratio between the core of the first fiber and the cladding surrounding the core changes over a length of the first fiber; and an output fiber having a core and a cladding, surrounding the core of the output fiber, with a diameter that matches the diameter of the cladding of the input fiber at a waist of the output fiber, wherein a core fundamental mode of the input fiber matches a core fundamental mode of the output fiber at the waist of the output fiber, wherein the diameter of the cladding of the output fiber increases adiabatically, and wherein the core and the cladding surrounding the core of the second fiber are adiabatically tapered such that a ratio between the core of the second fiber and the cladding surrounding the core of the second fiber is constant over a length of the second fiber.

In some implementations, a method includes stripping, over a first length, a coating from an input fiber; etching at least an inner cladding of the input fiber adiabatically over a portion of the first length such that a core-to-cladding ratio of the input fiber changes over the portion of the first length; stripping, over a second length, a coating from an output fiber; tapering an inner cladding and a core of the output fiber adiabatically over a portion of the second length such that a core-to-cladding ratio of the output fiber is constant over the portion of the second length; and splicing the input fiber to the output fiber at a splice point that corresponds to a waist of the input fiber and a waist of the output fiber, wherein a core fundamental mode of the input fiber matches a core fundamental mode of the output fiber at the splice point, and wherein the inner cladding of the input fiber and the inner cladding of the output fiber include respective diameters that match at the splice point.

BRIEF DESCRIPTION OF THE DRAWINGS

FIG. 3 is a diagram of an example optical system that includes a high cladding power MFA as described herein.

DETAILED DESCRIPTION

Figure 1:
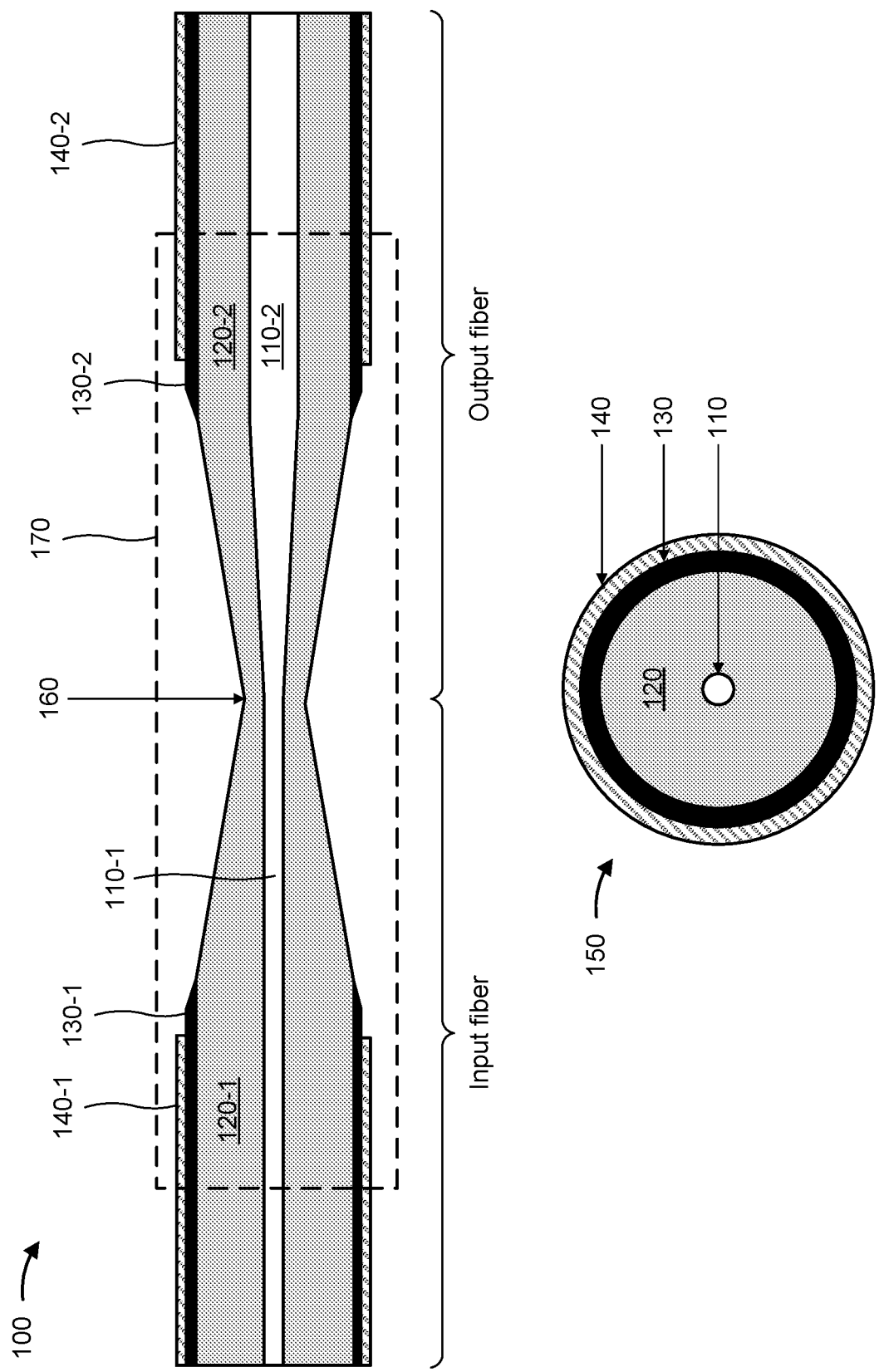
FIG. 1 is a diagram of an example high cladding power mode field adapter (MFA) described herein.

The following detailed description of example implementations refers to the accompanying drawings. The same reference numbers in different drawings may identify the same or similar elements.

As described above, a mode field adapter (MFA) is an optical device that can be used to merge or otherwise match core fundamental mode fields of a first fiber (e.g., an input fiber) and a second fiber (e.g., an output fiber). For example, in a fiber laser system such as a cladding pumped high-power fiber laser with a master oscillator fiber amplifier (MOFA) configuration, an MFA is usually needed to match a mode field of a seed laser (e.g., an oscillator) fiber and a core fundamental mode (which may be referred to herein as an LP01 mode) of an amplifier fiber to improve beam quality. For example, an MFA may be used to efficiently expand a core fundamental mode of a single-mode or large-mode-area (LMA) input fiber to match an LP01 mode of a larger LMA fiber and/or to expand the mode field of a polarization-maintaining (PM) fiber to match the LP01 mode of a polarization-maintaining LMA (PLMA) fiber. Furthermore, an MFA may be bidirectional and can be used in reverse to compress a core fundamental mode field when the output end is used as an input. Accordingly, when an MFA is spliced into a beam delivery system or another high-power setup, signal transmission and/or beam quality may be improved relative to a standard splice that is typically associated with high insertion loss and degraded beam quality (e.g., a poor M2 factor, which refers to a beam propagation ratio or beam quality factor that represents a degree of variation of a beam from an ideal Gaussian beam).

However, existing MFA designs are generally limited to matching the core fundamental mode fields of the two fibers that are connected using the MFA. Accordingly, existing MFA designs either cannot handle high-power cladding light or have a limited ability to handle high-power cladding light, which makes existing MFA designs unsuitable for applications that carry high-power light in the cladding in addition to light carried in the fiber core. For example, one existing MFA design is an MFA with a thermally expanded core (TEC), which has been widely used in some single-mode fibers. However, an MFA with a TEC does not work well for many LMA fibers, especially when the LMA fibers have relatively large cores and a low numerical aperture (NA). Accordingly, MFA designs that are based on the TEC technique have applications that are limited to a few fiber types. Furthermore, in some cases, an MFA with a TEC and fiber tapering may be used, where combining the TEC and fiber tapering techniques can work for a wider range of fibers. However, in cases where the cladding size of the input fiber is the same as or larger than the cladding size of the output fiber, the input side will have a larger cladding diameter at the splice point than the output side, which may prevent an MFA with TEC and fiber tapering from working when high-power cladding light is present. Furthermore, an MFA with fiber tapering only has similar drawbacks, in that the cladding sizes are usually mismatched at the splice point such that an MFA with fiber tapering may fail to sufficiently preserve high-power cladding light (e.g., a beam parameter product (BPP) may be a few time higher, which significantly worsens beam quality and incurs significant loss).

Some implementations described herein relate to a high cladding power MFA that matches a core fundamental mode of a first fiber (e.g., a single-mode or LMA input fiber) to an LP01 mode of a second fiber (e.g., a larger LMA output fiber) and matches a cladding size of the first fiber to a cladding size of the second fiber in order to handle high-power cladding light and preserve brightness. For example, in some implementations, the MFA may include a first fiber that includes a core associated with a fundamental mode field and a second fiber that includes a core associated with a fundamental mode field that matches the fundamental mode field of the first fiber at a splice point between the first fiber and the second fiber (e.g., corresponding to a waist of the first fiber and a waist of the second fiber). For example, as described herein, the core fundamental mode field of an optical fiber may be related to a mode field diameter (MFD), which is a measure of the width of an irradiance distribution (e.g., an optical power per unit area, across the end-face of a single-mode fiber) that may be considered analogous to a $1/e^2$ measure of a beam diameter for a beam propagating in free space.

Accordingly, in cases where the core of the first fiber and the core of the second fiber have the same numerical aperture (NA), the core mode fields may match when the core diameters are the same. Alternatively, in cases where the cores of the first fiber and the second fiber have different NAs, the MFA may match the core fundamental mode (or LP01 mode) fields of the input and output fibers. Furthermore, as described herein, the first fiber may include a cladding, surrounding the core of the first fiber, that is etched (e.g., to remove material from the cladding) such that a diameter of the cladding surrounding the core of the first fiber decreases adiabatically toward a waist of the first fiber. Furthermore, the second fiber may include a cladding that surrounds the core of the second fiber, where the core and the cladding surrounding the core of the second fiber may be tapered (e.g., pulled to a desired size after the second fiber is heated) such that a diameter of the cladding surrounding the core of the second fiber matches the diameter of the cladding of the first fiber at the waist of the second fiber and increases adiabatically from the waist of the second fiber. In this way, the MFA described herein has a design that may preserve light traveling in the claddings (e.g., ensure that there is no loss of cladding light) and conserve brightness of the cladding light.

FIG. 1 is a diagram of an example high cladding power MFA 100 described herein. As shown in FIG. 1, the high cladding power MFA includes an input fiber spliced to an output fiber at a splice point 160 that corresponds to a waist of the input fiber and a waist of the output fiber. As shown in FIG. 1, the input fiber and the output fiber each include a core 110 that is surrounded by a first (inner) cladding 120, a second (outer) cladding 130 surrounding the first cladding 120, and a coating 140 surrounding the second cladding 130. Furthermore, in FIG. 1, reference number 150 depicts a cross-sectional view of the input fiber and/or the output fiber, where in one example arrangement the core 110 may have a thirty (30) micrometers (μm) diameter, the first cladding 120 may have a 440 μm diameter, the second cladding 130 may have a 500 μm diameter, and the coating 140 may have a 650 μm diameter. However, it will be appreciated that these diameters are examples only, and that other suitable dimensions may be used. For example, the diameter of the first cladding 120 may generally range from 0.04 millimeters to more than 2 millimeters, and the diameters of the core 110 and second cladding 130 may be varied accordingly. Furthermore, although the example high power MFA 100 illustrated in FIG. 1 is a double cladding fiber, it will be appreciated that the input fiber and the output fiber may have one cladding layer, two cladding layers, three cladding layers, or more than three cladding layers. In general, where the input fiber and/or output fiber have multiple claddings, the multiple claddings may be referred to as a first cladding, a second cladding, a third cladding, and so on, from inside to outside (e.g., an innermost cladding may be referred to as the first cladding, a cladding surrounding the innermost cladding may be referred to as the second cladding, and so on). Furthermore, in some implementations, the input fiber and the output fiber may have different numbers of cladding layers, the cladding layers may have different sizes, and/or the cladding layers may have different shapes (e.g., circular, hexagonal, octagonal, and/or D-shaped).

In some implementations, as shown in FIG. 1, the high cladding power MFA 100 may have a design in which the input fiber has a coating 140-1 that is stripped over a certain length, and the claddings 120-1 and 130-1 are then adiabatically etched down to the designed diameters (e.g., by removing material from the claddings 120-1, 130-1). The etched regions of the claddings 120-1 and 130-1 may then be fire polished. In some implementations, the etching of the claddings 120-1, 130-1 is smooth (e.g., adiabatic) to ensure that there is no loss and to conserve brightness. Accordingly, as described herein, the high cladding power MFA 100 may have design in which any cladding that could carry power is adiabatically etched in order to maintain brightness of light carried in such cladding(s). Furthermore, as shown, the output fiber has a coating 140-2 that is also stripped over a certain length before the outer cladding 130-2 is adiabatically etched away and fire polished over the etched sections to smooth the glass surface that is roughened by the etching. In some implementations, the inner cladding 120-2 and the core 110-2 of the output fiber are then adiabatically tapered such that the diameter of the inner cladding 120-2 matches the diameter of the inner cladding 120-1 of the etched input fiber. During the tapering of the inner cladding 120-2, the core 110-2 is also adiabatically tapered. For example, to taper the inner cladding 120-2 and the core 110-2 of the output fiber, the output fiber may be heated and pulled to a desired size such that the inner cladding 120-2 and the core 110-2 are tapered at the same ratio (e.g., the tapering does not change a ratio between the inner cladding 120-2 and the core 110-2). The input fiber is then spliced to the output fiber at the splice point 160, and the sample is sealed within a package 170 (e.g., to protect the exposed components in the area where the coatings 140-1, 140-2 were removed from the input fiber and the output fiber).

In some implementations, as described herein, a method for making the high cladding power MFA 100 may include stripping the coating 140-1 of the input fiber, adiabatically etching away one or more outer claddings 130-1 (if any) of the input fiber, and adiabatically etching the inner cladding 120-1 to a designed size (e.g., a diameter that is matched to a diameter of the inner cladding 120-2 of the output fiber at the splice point 160). For example, in some implementations, the outer cladding(s) 130-1 and the inner cladding 120-1 of the input fiber may be adiabatically etched (e.g., to remove material) using an acid etching process, a $CO_2$ laser ablation process, a mechanical machining process, and/or another suitable material removal process. In general, when the outer cladding(s) 130-1 and the inner cladding 120-1 are etched, material is removed only from the outer cladding(s) 130-1 and the inner cladding 120-1, and the core 110-1 is unaffected, whereby the etching can be used to change or otherwise control a ratio between the core 110-1 and the inner cladding 120-1. In some implementations, glass surfaces of the etched claddings 120-1, 130-1 may be rough after the etching, whereby the etched sections of the claddings 120-1, 130-1 may be fire polished, $CO_2$ laser polished, mechanically polished, and/or otherwise polished to smooth the roughened surfaces of the etched claddings 120-1, 130-1. The input fiber may then be cleaved at a waist (e.g., a location along the input fiber where the diameter has a target value). In some implementations, the coating 140-2 may be similarly stripped from the output fiber, and the outer cladding(s) 130-2 (if any) of the output fiber are adiabatically etched away with acid, laser ablation, mechanical machining, and/or other suitable techniques. The etched sections of the outer cladding(s) 130-2, if any, are then fire polished or otherwise polished to smooth a glass surface that may have been roughened by the etching. In some implementations, the inner cladding 120-2 and the core 110-2 of the output fiber are then adiabatically tapered to the designed size (e.g., by heating the output fiber and pulling the output fiber until the inner cladding 120-2 and the core 110-2 have a desired size), and the output fiber is then cleaved at a waist of the output fiber. The input fiber is then spliced to the output fiber at the splice point 160 and properly packed (e.g., sealed within a package 170).

Accordingly, by carefully designing the parameters (e.g., selecting diameters, etch lengths, tapering parameters, and/or other parameters that satisfy an adiabatic condition), the LP01 mode fields of the respective cores 110-1, 110-2 and the diameters of the inner claddings 120-1, 120-2 of the input and output fibers may be matched at the splice point 160, which may allow the high cladding power MFA 100 to maintain high beam quality in the cores 110-1, 110-2 and also allow high power cladding light to pass through the inner claddings 120-1, 120-2 with little or no loss or degradation. For example, using a combination of etching and tapering as described herein, the MFA 100 may be designed to match core fundamental modes and cladding sizes for almost any combination of input and output fibers. Furthermore, in some implementations, the high cladding power MFA 100 may maintain high beam quality in the cores 110-1, 110-2 and allows high power cladding light to pass through the inner claddings 120-1, 120-2 regardless of whether the cores 110-1, 110-2 have the same NA or different NAs.

For example, the diameters of the cores 110-1, 110-2 may match at the splice point 160 in cases where the cores 110-1, 110-2 have the same NA, or the mode fields of the fundamental modes (LP01 modes) may be matched at the splice point 160 when the cores 110-1, 110-2 have different NAs. In one example, where the core 110-1 of the input fiber and the core 110-2 of the output fiber have the same NA and different diameters, the input fiber and the output fiber may be adiabatically etched and/or adiabatically tapered such that the diameters of the cores 110-1, 110-2 and the diameters of the inner claddings 120-1, 120-2 match at the splice point. For example, assuming that the core 110-1 and the inner cladding 120-1 of the input fiber have respective diameters of 12 µm and 500 µm and that the core 110-2 and the inner cladding 120-2 of the output fiber have respective diameters of 30 µm and 500 µm, the input fiber may be adiabatically etched such that the core 110-1 and the inner cladding 120-1 of the input fiber have respective diameters of 12 µm and 200 µm at the splice point 160 that corresponds to the waist of the input fiber. Furthermore, the output fiber may be adiabatically tapered such that the core 110-2 and the inner cladding 120-2 of the output fiber have respective diameters of 12 µm and 200 µm at the splice point 160 that corresponds to the waist of the input fiber. In another example, if the core 110-1 and the inner cladding 120-1 of the input fiber have respective diameters of 20 µm and 500 µm and the core 110-2 and the inner cladding 120-2 of the output fiber have respective diameters of 30 µm and 500 µm, then the input fiber and the output fiber may be adiabatically etched and/or tapered such that the cores 110-1, 110-2 each have a diameter of 20 µm at the splice point 160 and the inner claddings 120-1, 120-2 each have a diameter of 333 µm at the splice point 160.

Alternatively, in cases where the cores 110-1, 110-2 have different NAs, the mode field diameter may be determined based on a wavelength. In one example, the core 110-1 and the inner cladding 120-1 of the input fiber have respective diameters of 12 μm and 500 μm, the core 110-1 of the input fiber has an NA of 0.065, the core 110-2 and the inner cladding 120-2 of the output fiber have respective diameters of 30 μm and 450 μm, the core 110-2 of the output fiber has an NA of 0.1, and the wavelength is 1080 nanometers (nm). In this example, the inner cladding 120-1 of the input fiber may be adiabatically etched such that the core 110-1 and the inner cladding 120-1 have respective diameters of 12 μm and 258 μm at the splice point 160 that corresponds to the waist of the input fiber. Furthermore, the inner cladding 120-2 and the core 110-2 of the output fiber may be adiabatically tapered such that the core 110-2 and the inner cladding 120-2 of the output fiber have respective diameters of 17.2 μm and 258 μm at the splice point 160 that corresponds to the waist of the input fiber. In this case, the fundamental mode fields of the cores 110-1, 110-2 match, and the sizes of the inner claddings 120-1, 120-2 match, as the mode field diameters are the same for a 12 μm diameter and a 0.065 NA and a 17.2 μm diameter and a 0.1 NA at a wavelength of 1080 nm.

Accordingly, as shown in FIG. 1 and described herein, the high cladding power MFA 100 may match the core fundamental mode of the input fiber to the core fundamental mode of the output fiber, and may also match inner cladding sizes of the input fiber and the output fiber to handle high-power cladding light that may be carried in the inner claddings 120-1, 120-2 and preserve brightness of the high-power cladding light. For example, as described herein, the input fiber may include a core 110-1 associated with a fundamental mode field and a cladding 120-1, surrounding the core 110-1 of the first fiber, with a diameter that decreases adiabatically toward a waist of the first fiber. Furthermore, the high cladding power MFA includes an output fiber with a core 110-2 associated with a fundamental mode field that matches the fundamental mode field of the input fiber at a waist of the output fiber. As shown, the output fiber also includes a cladding 120-2, surrounding the core 110-2 of the output fiber, with a diameter that matches the diameter of the cladding 120-1 of the input fiber at the waist of the output fiber, where the diameter of the cladding 120-2 of the output fiber increases adiabatically from the waist of the output fiber. Accordingly, in cases where the claddings 120-1, 120-2 are arranged to carry high-power cladding light, the diameter of the inner cladding 120-1 of the input fiber decreases adiabatically and the diameter of the inner cladding 120-2 of the output fiber increases adiabatically to preserve brightness of cladding light carried in the claddings 120-1, 120-2. Furthermore, in cases where the input fiber and/or output fiber include one or more outer claddings (e.g., surrounding an inner cladding 120), the outer cladding(s) may have diameters that increase and/or decrease adiabatically. Furthermore, as shown, the high cladding power MFA may include a package 170 sealing at least a first length over which the inner cladding 120-1 of the input fiber decreases in size and a second length over which the inner cladding 120-2 of the output fiber increases in size. For example, the input fiber and the output fiber include respective coatings 140-1, 140-2 that are stripped over at least the first length over which the inner cladding 120-1 of the input fiber decreases in size and the second length over which the inner cladding 120-2 of the output fiber increases in size, and the package 170 may seal at least the area where the respective coatings 140-1, 140-2 are stripped.

As indicated above, FIG. 1 is provided as an example. Other examples may differ from what is described with regard to FIG. 1. The number and arrangement of devices shown in FIG. 1 are provided as examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
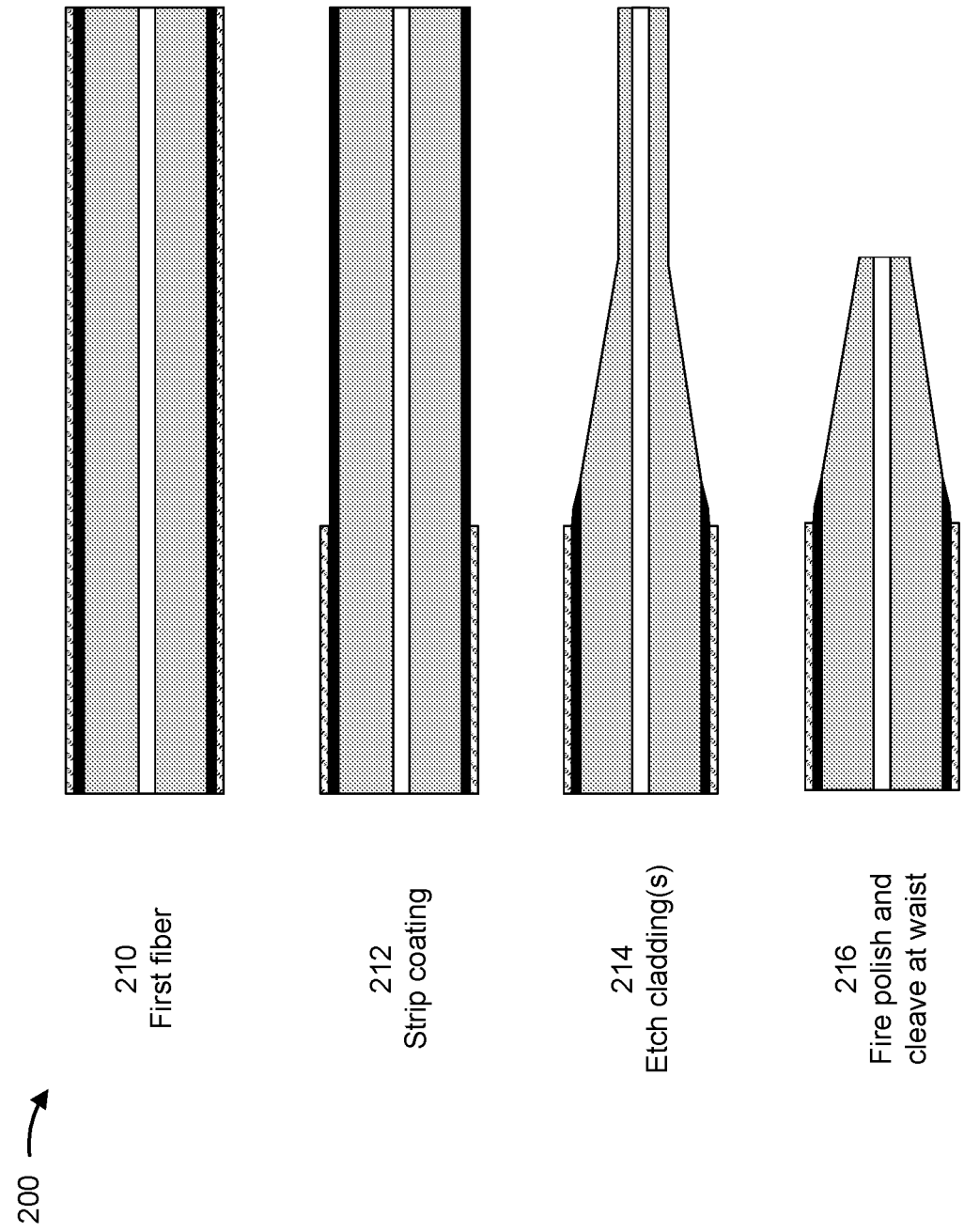
FIGS. 2A-2C are diagrams of an example process for fabricating a high cladding power MFA as described herein.
Figure 2B:
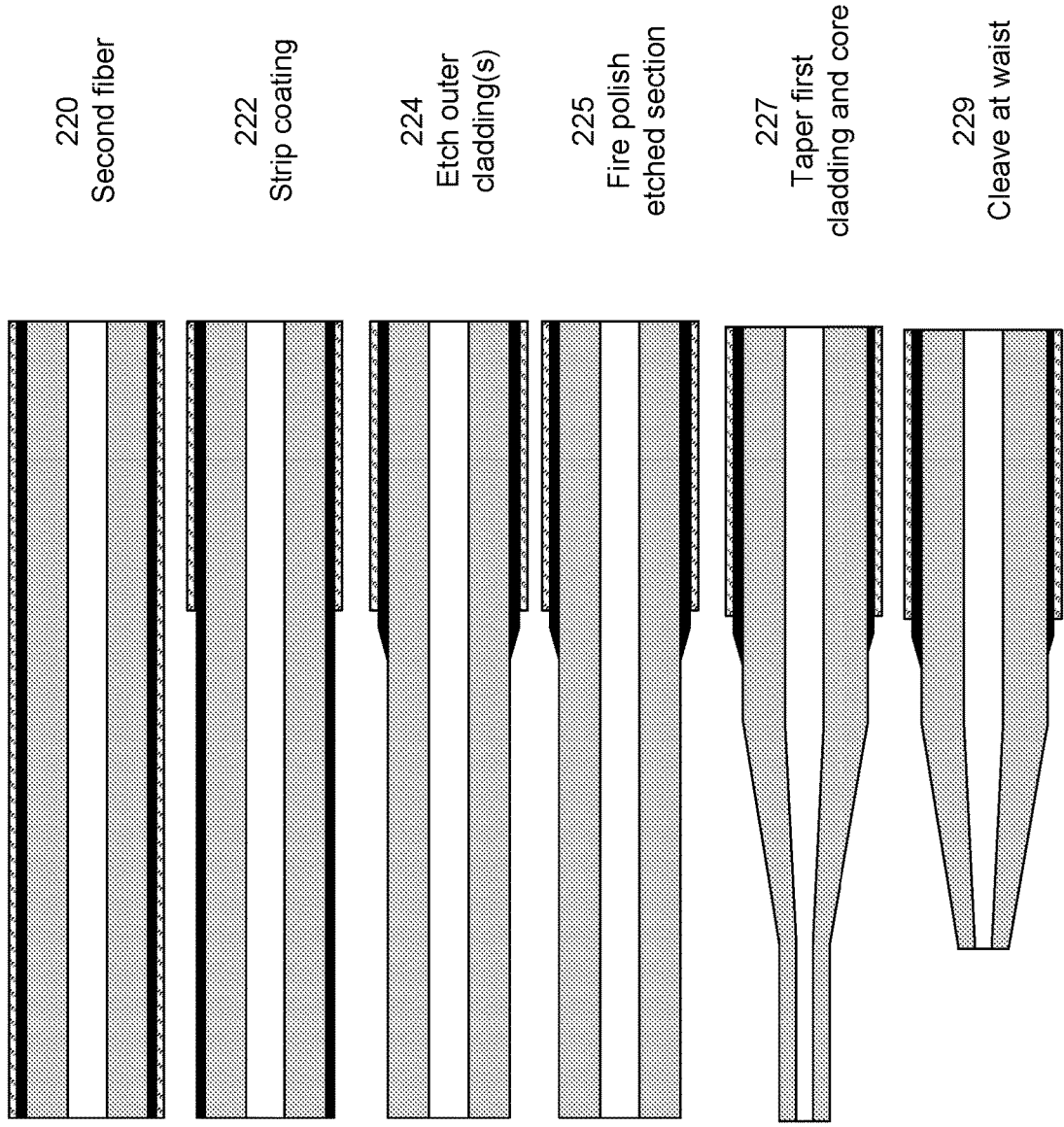
Figure 2C:
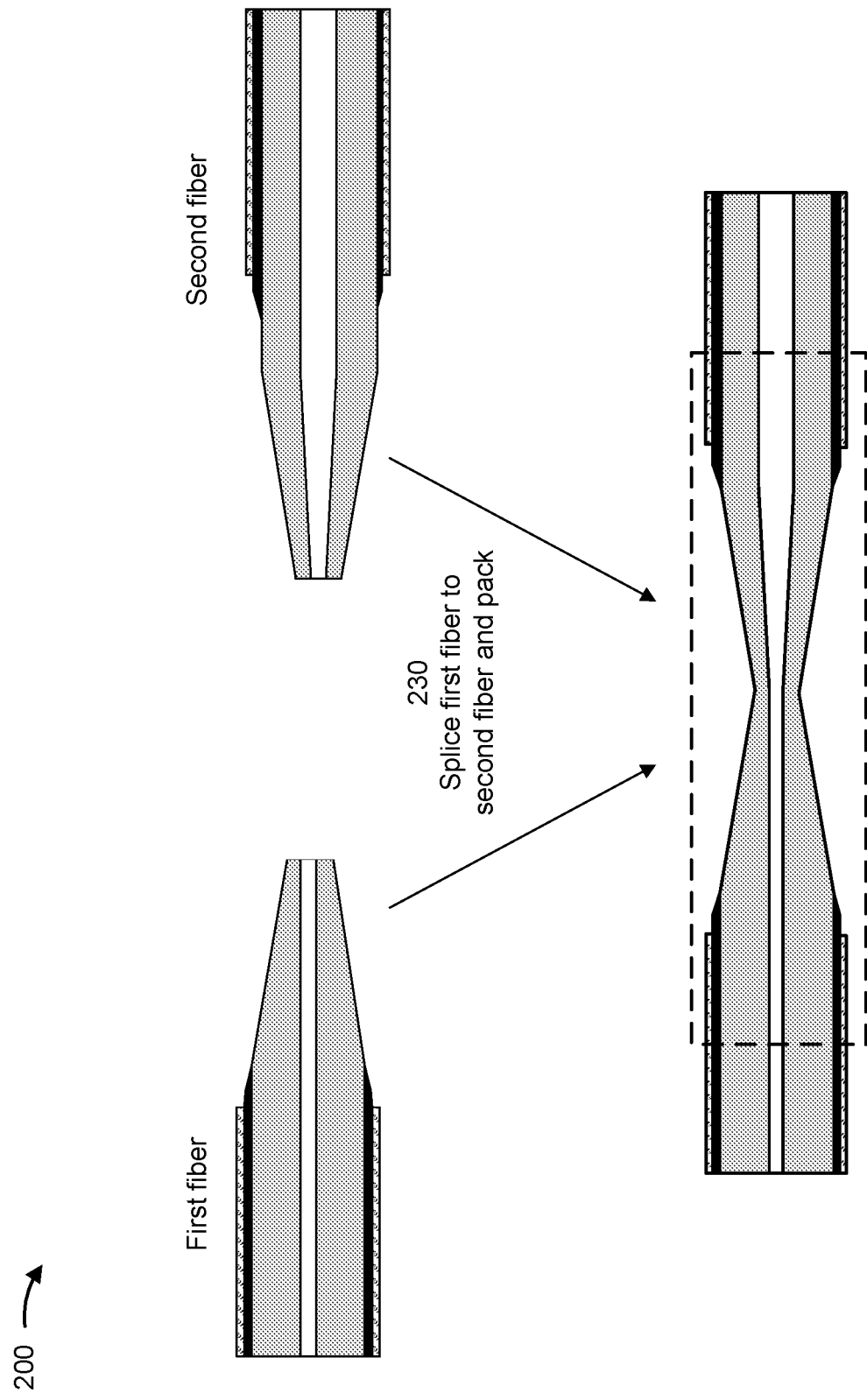

FIGS. 2A-2C are diagrams of an example process 200 for fabricating a high cladding power MFA as described herein.

In some implementations, as shown in FIG. 2A, and by reference number 210, a first fiber (e.g., an input fiber) may include a core, an inner cladding surrounding the core, an outer cladding surrounding the inner cladding, and a coating surrounding the outer cladding. As shown by reference number 212, the coating of the first fiber may be stripped over a desired length. As further shown in FIG. 2A, and by reference number 214, the inner cladding and the outer cladding of the first fiber are adiabatically etched to a designed size. For example, in some implementations, the outer cladding and the inner cladding of the first fiber may be adiabatically etched (e.g., to remove material) using an acid etching process, a $CO_2$ laser ablation process, a mechanical machining process, and/or another suitable material removal process. In general, when the outer cladding and the inner cladding are etched, material is removed only from the claddings, and the core of the first fiber is unaffected, whereby the etching can be used to change or otherwise control a ratio between the core and the inner cladding of the first fiber. In some implementations, glass surfaces of the etched claddings 1 may be rough after the etching. Accordingly, as shown by reference number 216, the etched sections of the claddings may be fire polished, $CO_2$ laser polished, mechanically polished, and/or otherwise polished to smooth the roughened surfaces of the etched claddings. As further shown by reference number 216, the first fiber may then be cleaved at a waist (e.g., a location along the first fiber where the diameter has a target value).

In some implementations, as shown in FIG. 2B, and by reference number 220, a second fiber (e.g., an output fiber) may include a core, an inner cladding surrounding the core, an outer cladding surrounding the inner cladding, and a coating surrounding the outer cladding. As shown by reference number 222, the coating of the second fiber may be stripped over a desired length. As shown by reference number 224, one or more outer claddings (if any) of the output fiber are adiabatically etched away with acid, laser ablation, mechanical machining, and/or other suitable techniques. As shown by reference number 225, any etched sections of the outer cladding(s) are then fire polished or otherwise polished to smooth a glass surface that may have been roughened by the etching. As shown by reference number 227, the inner cladding and the core of the output fiber are then adiabatically tapered to the designed size (e.g., by heating the output fiber and pulling the output fiber until the inner cladding and the core have a desired size). As shown by reference number 229, the output fiber is then cleaved at a waist of the output fiber. Accordingly, as shown in FIG. 2C, and by reference number 230, the input fiber is then spliced to the output fiber at a splice point and properly packed (e.g., sealed within a package).

As indicated above, FIGS. 2A-2C are provided as an example. Other examples may differ from what is described with regard to FIGS. 2A-2C. For example, FIGS. 2A-2C illustrate an example process 200 where the high cladding power MFA is fabricated by etching the input fiber to change a core-to-inner cladding ratio of the input fiber and tapering the inner cladding and the core of the output fiber to maintain a core-to-inner cladding ratio of the output fiber. In other examples, both the input fiber and the output fiber may be adiabatically etched (e.g., the cores of the input and output fiber are unchanged), the cladding of the input fiber may be etched and the cladding of the output fiber may be tapered, the cladding of the input fiber may be etched and the cladding of the output fiber may be etched (either to a single diameter or in to a tapered configuration) before the core and cladding of the (etched) output fiber are tapered, the cladding and the core of both the input fiber and the output fiber may be tapered, or a combination of etching and tapering may be used for both the input fiber and the output fiber.

FIG. 3 is a diagram of an example optical system 300 that includes a high cladding power MFA 100 as described herein. For example, the optical system 300 shown in FIG. 3 may be an example of a cladding-pumped high-power fiber laser with a master oscillator fiber amplifier (MOFA) configuration, where the MFA 100 may be needed in order to match the mode field of a seed laser (e.g., a fiber laser oscillator 320) and an LP01 mode of an amplifier 330 to improve beam quality. For example, as shown in FIG. 3, the optical system 300 may include a pump combiner 310, a fiber laser oscillator 320, and an amplifier 330, where the oscillator 320 includes a fiber that has a much smaller core than the amplifier 330, and the fibers of the oscillator 320 and the amplifier 330 both carry high power cladding light. Accordingly, in some implementations, the high cladding power MFA may act as a bridge fiber between the oscillator 320 and the amplifier 330, matching both the core fundamental modes and the diameters of the innermost claddings of the oscillator 320 and the amplifier 330. In this way, the high cladding power MFA 100 may handle high-power cladding light carried in the innermost claddings of the oscillator 320 and the amplifier 330 such that beam quality and power are maintained in both the cores and the claddings surrounding the respective cores.

Accordingly, as described herein, the high cladding power MFA 100 may be used in an optical system that includes a first optical device having a core to carry core light and a cladding, surrounding the core, to carry high-power cladding light and a second optical device having a core to carry core light and a cladding, surrounding the core, to carry high-power cladding light, where the cores of the first optical device and the second optical device have different fundamental mode fields. For example, the high cladding power MFA 100 may be coupled between the first optical device and the second optical device and may include an input fiber having a core and a cladding, surrounding the core of the input fiber, with a diameter that decreases adiabatically. In addition, the high cladding power MFA may include an output fiber having a core and a cladding, surrounding the core of the output fiber, with a diameter that matches the diameter of the cladding of the input fiber at a waist of the output fiber. Accordingly, a core fundamental mode of the input fiber matches a core fundamental mode of the output fiber at the waist of the output fiber, and the diameter of the cladding of the output fiber increases adiabatically such that beam quality and power are maintained in both the cores and the claddings surrounding the respective cores. For example, in the optical system 300 shown in FIG. 3, the first optical device may be a fiber laser oscillator 320 arranged to receive cladding light from a pump combiner 310. The fiber laser oscillator 320 may absorb a portion of the received cladding light, and may transmit the rest of the cladding light (the unabsorbed portion) toward the high cladding power MFA 100. Furthermore, the second device may be an amplifier 330 that is arranged to receive the cladding light from the high cladding power MFA 110, where most cladding light will be absorbed in the amplifier 330 and a remaining portion of the cladding light is transmitted to a feeding fiber (not explicitly shown). Simultaneously, the optical system 300 will transmit light in the core of fiber laser oscillator 320 into the cores of the high cladding power MFA 100, through the cores of the high cladding power MFA 100, into the core of the amplifier 330 (where the power in the core is amplified by the power in the cladding), and into a feeding fiber (not explicitly shown).

As indicated above, FIG. 3 is provided as an example. Other examples may differ from what is described with regard to FIG. 3. The number and arrangement of devices shown in FIG. 3 are provided as examples. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
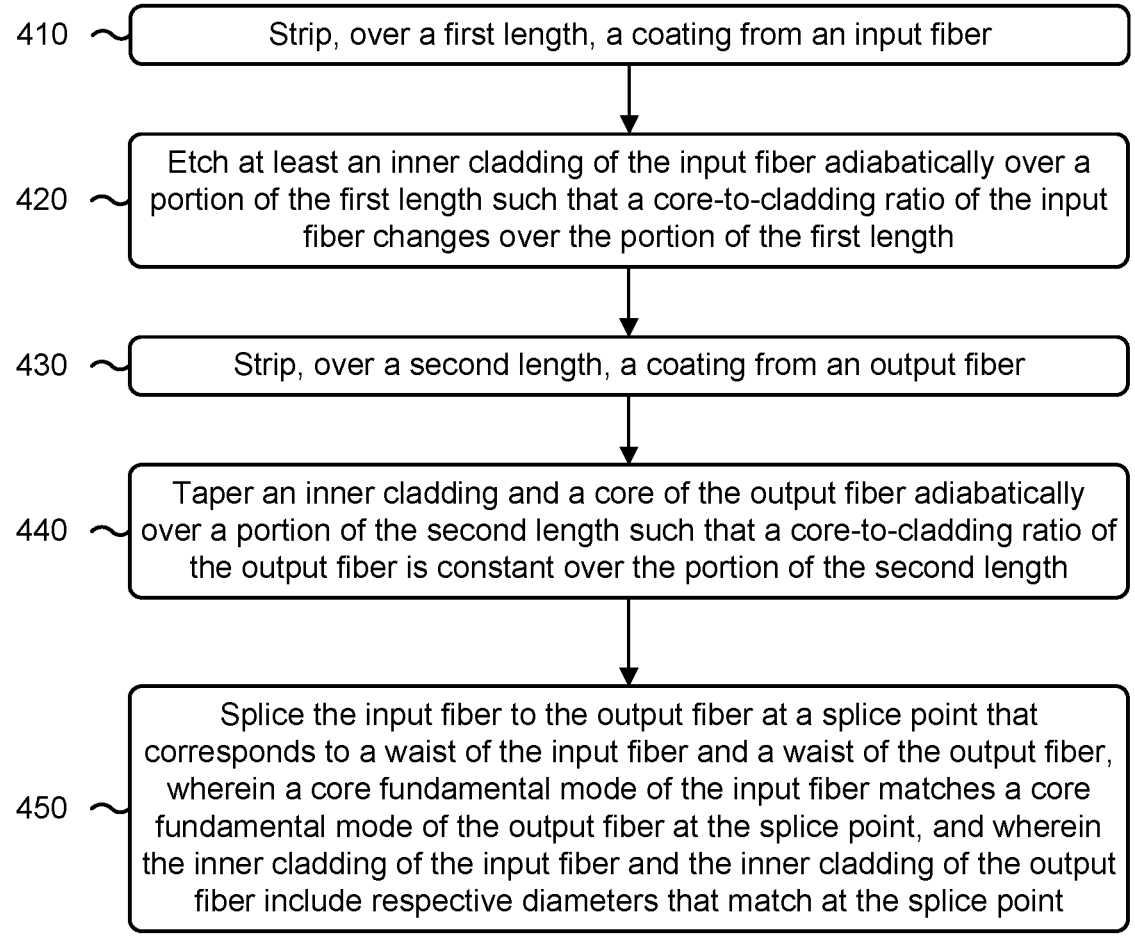
FIG. 4 is a diagram of an example method for making a high cladding power MFA as described herein.

FIG. 4 is a flowchart of an example method 400 for making a high cladding power mode field adapter as described herein.

As shown in FIG. 4, method 400 may include stripping, over a first length, a coating from an input fiber (block 410). As further shown in FIG. 4, method 400 may include etching at least an inner cladding of the input fiber adiabatically over a portion of the first length such that a core-to-cladding ratio of the input fiber changes over the portion of the first length (block 420). In some implementations, the inner cladding and any outer claddings of the input fiber may be etched using an acid etching process, a laser ablation process, a mechanical machining process, and/or another suitable process.

As further shown in FIG. 4, method 400 may include stripping, over a second length, a coating from an output fiber (block 430). As further shown in FIG. 4, method 400 may include tapering an inner cladding and a core of the output fiber adiabatically over a portion of the second length such that a core-to-cladding ratio of the output fiber is constant over the portion of the second length (block 440). In some implementations, in cases where the output fiber includes one or more outer claddings, the one or more outer claddings of the output fiber may be etched using an acid etching process, a laser ablation process, a mechanical machining process, and/or another suitable process. In some implementations, the output fiber may include a core with a diameter that changes over the portion of the second length.

In some implementations, after etching the inner cladding of the input fiber (and any outer cladding(s) of the input fiber, if present), the etched cladding(s) of the input fiber may be polished, and the input fiber may be cleaved at a waist of the input fiber. Furthermore, in cases where the output fiber includes one or more outer claddings, the one or more outer claddings of the output fiber may be polished after the one or more outer claddings are etched, and the output fiber may be cleaved at a waist of the output fiber. For example, in some implementations, the etched cladding(s) of the input fiber and/or the output fiber may be polished using a fire polishing process, a laser polishing process, a mechanical polishing process, or another suitable polishing process.

As further shown in FIG. 4, method 400 may include splicing the input fiber to the output fiber at a splice point that corresponds to the waist of the input fiber and the waist of the output fiber (block 450). In some implementations, the input fiber may be spliced to the output fiber after the input fiber and the output fiber are cleaved at the respective waists. In some implementations, as described herein, a core fundamental mode of the input fiber matches a core fundamental mode of the output fiber at the splice point, and the inner cladding of the input fiber and the inner cladding of the output fiber include respective diameters that match at the splice point. Furthermore, as described herein, the input fiber is etched adiabatically and the output fiber is tapered adiabatically to preserve brightness of cladding light carried in one or more claddings of the input fiber and one or more claddings of the output fiber.

In some implementations, after the input fiber is spliced to the output fiber at the splice point, at least the first length and the second length may be sealed within a package.

Although FIG. 4 shows example blocks of method 400, in some implementations, method 400 includes additional blocks, fewer blocks, different blocks, or differently arranged blocks than those depicted in FIG. 4. Additionally, or alternatively, two or more of the blocks of method 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "inner," "outer," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A mode field adapter, comprising:
   a first fiber including a core associated with a fundamental mode field diameter and a cladding, surrounding the core of the first fiber, with a diameter that decreases toward a waist of the first fiber, wherein the cladding surrounding the core of the first fiber is adiabatically etched such that a ratio between the core of the first fiber and the cladding surrounding the core changes over a length of the first fiber; and
   a second fiber including a core associated with a fundamental mode field diameter that matches the fundamental mode field diameter of the first fiber at a waist of the second fiber and a cladding, surrounding the core of the second fiber, with a diameter that matches the diameter of the cladding of the first fiber at the waist of the second fiber and increases from the waist of the second fiber, wherein the core and the cladding surrounding the core of the second fiber are adiabatically tapered such that a ratio between the core of the second fiber and the cladding surrounding the core of the second fiber is constant over a length of the second fiber.

2. The mode field adapter of claim 1, wherein the cladding of the first fiber and the cladding of the second fiber are arranged to carry high-power cladding light.

3. The mode field adapter of claim 1, wherein the diameter of the cladding of the first fiber decreases adiabatically and the diameter of the cladding of the second fiber increases adiabatically to preserve brightness of cladding light carried in the cladding of the first fiber and the cladding of the second fiber.

4. The mode field adapter of claim 1, wherein one or more of the first fiber or the second fiber includes an outer cladding that is adiabatically etched.

5. The mode field adapter of claim 1, wherein the core of the first fiber has a numerical aperture equal to a numerical aperture of the core of the second fiber.

6. The mode field adapter of claim 1, wherein the core of the first fiber has a numerical aperture that differs from a numerical aperture of the core of the second fiber.

7. The mode field adapter of claim 1, further comprising:
   a package sealing at least a first length over which the cladding of the first fiber is adiabatically etched and a second length over which the cladding and the core of the second fiber are adiabatically tapered.

8. The mode field adapter of claim 1, wherein the first fiber and the second fiber include respective coatings that are stripped over at least a first length over which the cladding of the first fiber is adiabatically etched and a second length over which the cladding and the core of the second fiber are adiabatically tapered.

9. An optical system, comprising:
a first optical device having a core to carry core light and a cladding, surrounding the core, to carry high-power cladding light;
a second optical device having a core to carry core light and a cladding, surrounding the core, to carry high-power cladding light, wherein the core of the first optical device and the core of the second optical device have different fundamental mode fields; and
a mode field adapter coupled between the first optical device and the second optical device, wherein the mode field adapter comprises:
an input fiber having a core and a cladding, surrounding the core of the input fiber, with a diameter that decreases adiabatically, wherein the cladding surrounding the core of the first optical device is adiabatically etched such that a ratio between the core of the first optical device and the cladding surrounding the core changes over a length of the first optical device; and
an output fiber having a core and a cladding, surrounding the core of the output fiber, with a diameter that matches the diameter of the cladding of the input fiber at a waist of the output fiber,
wherein a core fundamental mode of the input fiber matches a core fundamental mode of the output fiber at the waist of the output fiber,
wherein the diameter of the cladding of the output fiber increases adiabatically, and
wherein the core and the cladding surrounding the core of the second optical device are adiabatically tapered such that a ratio between the core of the second optical device and the cladding surrounding the core of the second optical device is constant over a length of the second optical device.

10. The optical system of claim 9, wherein the input fiber and the output fiber each include one or more claddings arranged to carry the high-power cladding light.

11. The optical system of claim 9, wherein the diameter of the cladding of the input fiber decreases adiabatically and the diameter of the cladding of the output fiber increases adiabatically to preserve brightness of the high-power cladding light.

12. The optical system of claim 9, wherein a core numerical aperture of the input fiber is equal to a core numerical aperture of the output fiber.

13. The optical system of claim 9, further comprising:
a pump combiner,
wherein the first optical device is a fiber laser oscillator arranged to receive the cladding light from the pump combiner and transmit the cladding light toward the mode field adapter, and
wherein the second optical device is an amplifier arranged to receive the cladding light from the mode field adapter and to transmit the cladding light toward a feeding fiber.

* * * * *